W. V. SMITH.
METALLIC PACKING RING.
APPLICATION FILED AUG. 13, 1913.
1,086,948.
Patented Feb. 10, 1914.
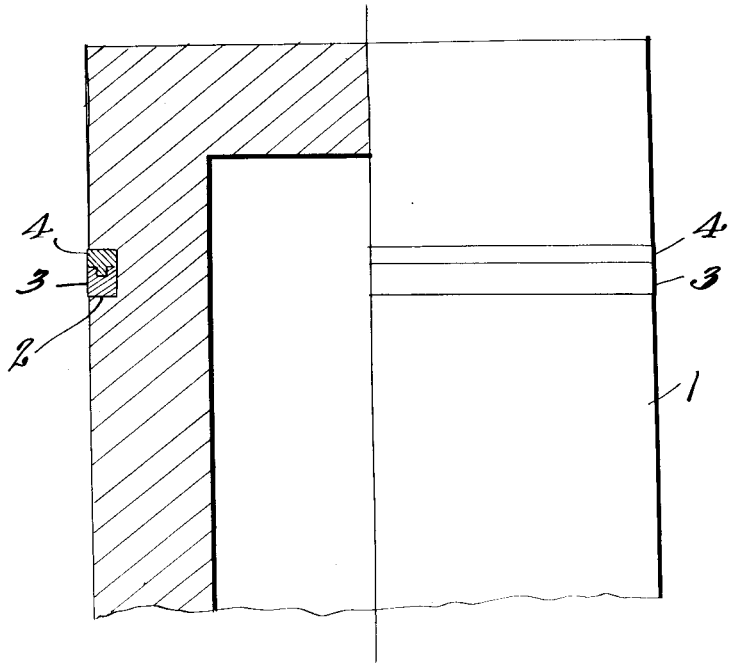
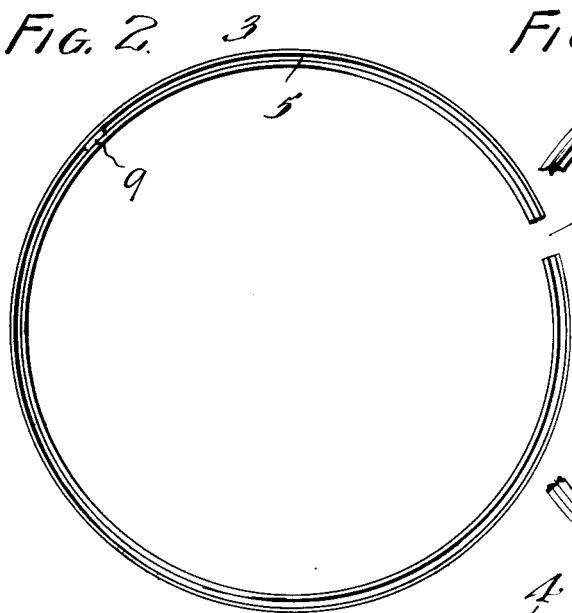
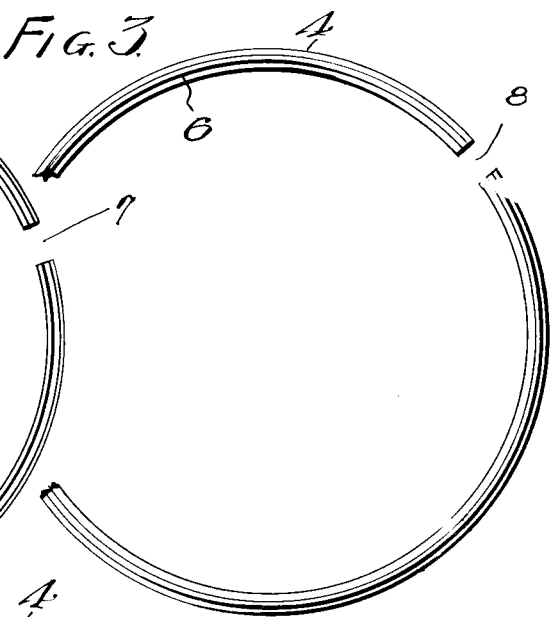
INVENTOR
WILLIAM V. SMITH

UNITED STATES PATENT OFFICE.

WILLIAM VICTOR SMITH, OF SCHENECTADY, NEW YORK.

METALLIC PACKING-RING.

1,086,948.     Specification of Letters Patent.     Patented Feb. 10, 1914.

Application filed August 13, 1913. Serial No. 784,546.

*To all whom it may concern:*

Be it known that I, WILLIAM VICTOR SMITH, a citizen of the United States, residing at Schenectady, in the county of Schenectady and State of New York, have invented certain new and useful Improvements in Metallic Packing-Rings, of which the following is a specification.

My invention relates to improvements in metallic packing rings for pistons of various characters, such as are used in cylinders of automobiles, motor cycles, air and steam hammers, air pumps, steam engines, gasolene, steam, and air engines, etc., and the special object of the invention is the provision of a simple, durable, and efficient packing ring that may be applied with facility and, when necessary, may be detached from the piston with equal facility.

The invention consists especially in the use of a double ring, and in the peculiar construction of each of these co-acting rings, and in the location of the points on these rings where they are mutilated or broken, this location being approximately at a distance of ninety degrees, one from the other.

In the accompanying drawings I have illustrated one complete example of the physical embodiment of my invention constructed according to the best mode I have so far devised for the practical application of the principles.

Figure 1 is a partial elevation and partial section of a piston having the packing ring applied thereto. Fig. 2 is a face view of a split groove ring forming one of the members of the metallic packing ring. Fig. 3 is a face view of a portion of a complementary ribbed split ring. Fig. 4 shows a portion of the two rings in operative position, and indicating the points where the rings are split, these points being approximately ninety degrees apart.

In Fig. 1 the piston 1 which may be used in automobiles, motor cycles, etc., is provided with the usual groove or recess 2 around its periphery. Within this groove 2 the packing ring is seated and incased. The packing ring comprises two pieces as 3 and 4, the ring 3 having a groove 5, and the ring 4 provided with a complementary rib 6. These rings are of suitable material such as high grade steel, cast-iron, or bronze, and the rings are of uniform size, while the recess 5 and rib 6, as will be understood, are adapted to fit one within the other with an easy joint. Each of the rings 3 and 4 is mutilated or split, as shown at 7 and 8, respectively, and the ring 3 is further provided with a dowel 9 which occupies the entire area of the groove 5 at its point of location. This dowel 9 is for the purpose of guiding and limiting the movement of the ring 4 with relation to the ring 3.

The split rings are assembled in the groove 2 in usual manner, and their elasticity or resiliency causes them to retain their position in the recess, while the split formation of the rings permits them to distend or contract, and yet at all times present a friction surface against the interior of the cylinder in which the piston is working, and the packing ring thus forms an effective barrier within the cylinder. The arrangement of the split portions of the ring as shown in Fig. 4 where they are located approximately ninety degrees apart gives an advantage in the operation of the rings in that the separation of the broken parts gives a wider area of movement of the two rings, while the dowel 9, as will be clearly seen in Fig. 4, prevents the excessive contraction of the ring 4, and consequently less liable to breaking or plugging of the parts.

Having thus described my invention, what I claim as new and desire to secure by Letters Patent, is:

A metallic packing ring comprising a pair of elastic broken rings, one of said rings having an annular groove with a dowel therein and the other ring having a complementary rib, and having its ends located one at each side of said dowel.

In testimony whereof I affix my signature in presence of two witnesses.

WILLIAM VICTOR SMITH.

Witnesses:
   SYLVESTER MULLANY,
   FRANK H. DETTBARN.